United States Patent [19]
Gombosi

[11] Patent Number: 4,744,614
[45] Date of Patent: May 17, 1988

[54] BAIT BOX AND RACK ASSEMBLY

[76] Inventor: Kenneth D. Gombosi, 1100 Richmond Street, Joliet, Ill. 60435

[21] Appl. No.: 850,182

[22] Filed: Apr. 10, 1986

[51] Int. Cl.$^4$ .................. B65D 85/50; A47B 81/00
[52] U.S. Cl. .................... 312/242; 43/54.1; 206/315.11; 211/71; 220/23.4; 220/345; 220/410
[58] Field of Search ............... 43/55, 54.1; 114/343, 114/344, 364; 206/315.11, 514; 211/88, 71, 75, 79; 220/329, 331, 339, 344, 345, 346, 347, 23.4, 23.83, 400, 401, 405, 408, 410; 224/42.42, 42.45, 42.46, 920; 312/242

[56] References Cited

U.S. PATENT DOCUMENTS

| | | | |
|---|---|---|---|
| 2,546,166 | 3/1951 | Pfefferkorn | 220/408 |
| 2,740,546 | 4/1956 | Kowalski | 211/71 |
| 2,935,858 | 5/1960 | Kingery | 43/55 |
| 3,278,009 | 10/1966 | Crump, Jr. | 220/345 |
| 3,445,050 | 5/1969 | Peters et al. | 220/408 |
| 3,458,113 | 7/1969 | Swartzbaugh | 220/339 |
| 3,566,836 | 3/1971 | Elfert | 43/055 |
| 3,608,770 | 9/1971 | Naimoli | 220/23.4 |
| 3,666,340 | 5/1972 | Albeanese | 220/344 |
| 3,958,289 | 5/1976 | Carlson | 114/364 |
| 4,057,166 | 11/1977 | Yamazaki et al. | 220/345 |
| 4,160,570 | 7/1979 | Bridges | 211/88 |
| 4,501,363 | 2/1985 | Isbey, Jr. | 206/514 |
| 4,593,642 | 6/1986 | Shay | 114/364 |

Primary Examiner—Jimmy G. Foster
Attorney, Agent, or Firm—Ernest Kettelson

[57] ABSTRACT

A bait box and rack comprising an air tight and water tight bait box and a rack mountable in a boat in which a plurality of such bait boxes can be held and secured in place by detachable securing means such as corresponding snap-in projections and recesses and the like. The bait boxes include lids or covers and releasable securing means such as corresponding tongues and grooves to secure the lid to each box in air tight and water tight relationship but in such a way that the lid can be readily opened, and the rack includes structure which enables opening and closing the lids of each bait box while the bait boxes are secured in place in the rack. The lids are preferably permanently connected to their respective bait boxes by such means as a flexible hinge, preferably constructed so as to fold inside of the bait box when the lid is secured in place to close the bait box.

13 Claims, 6 Drawing Sheets

BAIT BOX AND RACK ASSEMBLY

BACKGROUND OF THE INVENTION

This invention relates to the field of bait boxes for fishermen and corresponding racks mountable in a boat to hold a plurality of such bait boxes in a releasably securable manner whereby the bait boxes will not become dislodged while the boat is traveling through the water but can be readily removed from the rack when the fishermen desires.

Examples of prior art devices which are in a somewhat related field include those disclosed in U.S. Pat. No. 4,271,624, which shows not a rack and separate removable bait boxes but an integrally formed device having wells or cups formed integrally in the bottom of a structure which is itself mounted to the gunwale of a boat, the wells not having separate lids or covers that would make them air tight and water tight; U.S. Pat. No. 3,889,805, which shows not a rack and separate removable bait boxes but a block like structure having built-in cavities, in which two separate blocks are hinged together to open and remain open when being mounted in a boat and to close when not mounted in the boat, the mounting means being stretch cords to extend around side rails of a boat which is so equipped; and U.S. Pat. No. 3,824,733, which shows not a rack and separate removable bait boxes but an elongated storage compartment which can be secured to the side of a boat and a one-piece elongated lid to fit over the storage compartment, with spaced apart supports to hold a fish pole integrally formed on the lid and a number of also integrally formed shallow cups or compartments without lids in which various items of fishing tackle such as hooks, floats, sinkers and the like can be deposited.

Other prior art devices in another somewhat related field wherein the devices are worn by the fisherman himself include those disclosed in U.S. Pat. No. 3,897,650 which shows containers for fish lures which can be hung on the fisherman's belt; U.S. Pat. No. 4,323,181 which shows another kind of belt mounted tackle carrier; U.S. Pat. No. 3,755,956 which shows another kind of device hung on the fisherman's belt for holding and dispensing live insect bait; U.S. Pat. No. 3,399,484 which shows still another kind of bait box for hanging on the fisherman's belt with integrally formed built-in compartments not separately removable.

A major problem with prior art devices is that the bait boxes are not separately removable from the rack or whatever they are mounted or formed in, so they cannot be handled separately, are not interchangeable, cannot be taken from the rack or other structure and put in the fisherman's tackle box when through fishing so the rack can be left mounted to the boat and the bait boxes taken home, and other purposes for which it is desirable to be able to readily remove bait boxes from the rack or other structure leaving the rack mounted in the boat. The present invention solves that problem.

Other prior art bait boxes are not air tight and water tight to hold such things as fish attractant chemical materials or bait saturated with such substances in such a way that the fish attractant substances do not become diluted or escape into the atmosphere, and in such a way that the air tight, water tight lids on the bait boxes can be easily removed and put back on even when the bait boxes have been snapped in place or otherwise lockingly secured in the boat mounted rack as well as when removed from the rack. The present invention as disclosed herein also solves that problem.

Other advantages and improvements of the combination bait box and rack assembly in accordance with the present invention will be apparent from the detailed description which follows and the accompanying drawings.

DESCRIPTION OF PREFERRED EMBODIMENT

Figure 1:
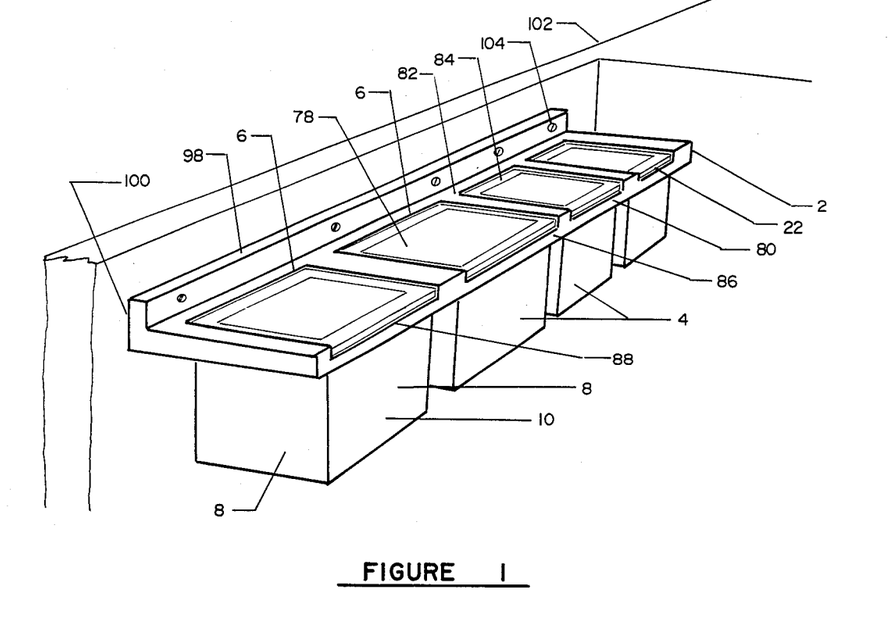
FIG. 1 is a perspective view of bait boxes and rack assembly in accordance with this invention shown mounted to the side wall of a boat.
Figure 10:
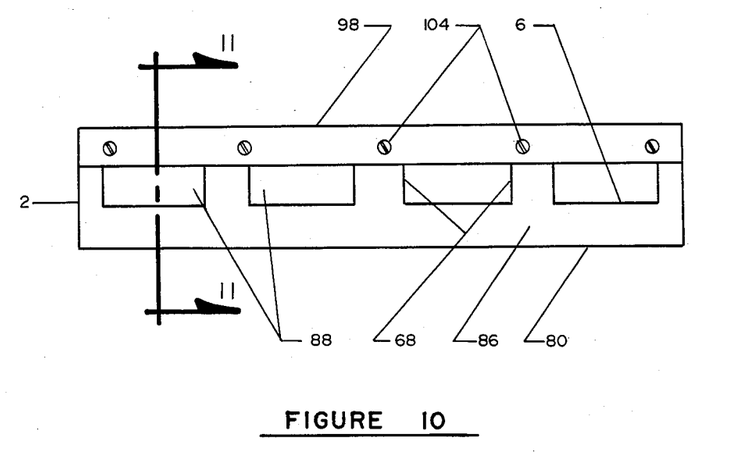
FIG. 10 is a front elevation view of the rack assembly in accordance with this invention with the bait boxes removed.

A bait box and rack assembly in accordance with the present invention includes a rack assembly 2 and a plurality of bait boxes 4 to seat in the apertures 6 of the rack assembly 2.

Figure 2:
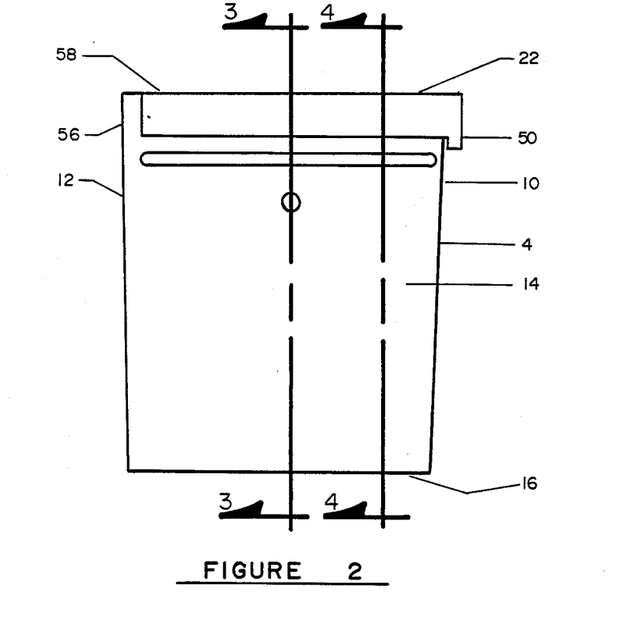
FIG. 2 is a side elevation view of a bait box in accordance with this invention with its lid in place.
Figure 3:
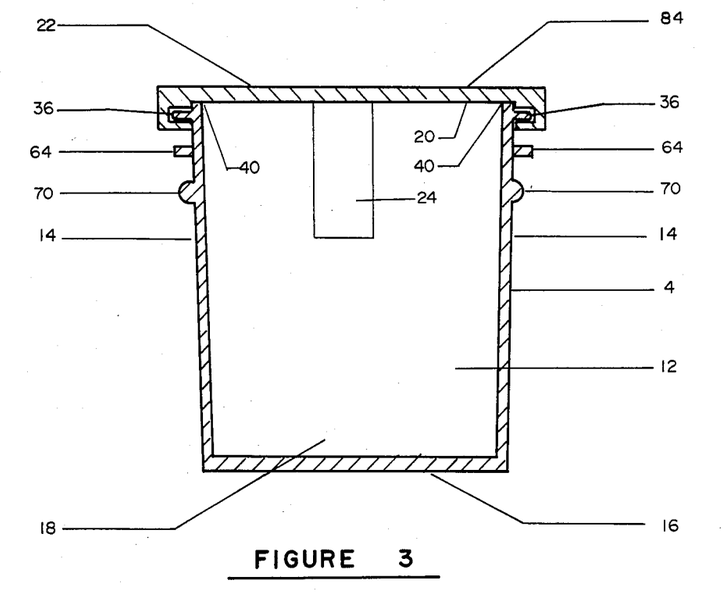
FIG. 3 is a section view taken on line 3—3 of FIG. 2 showing a section through one of the set of interlocking ribs on each side wall of the bait box.
Figure 4:
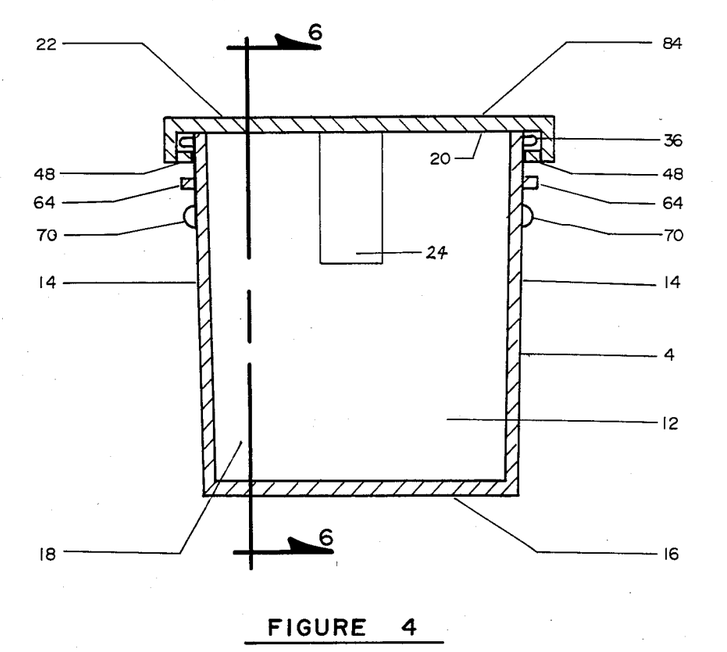
FIG. 4 is a section view taken on line 4—4 of FIG. 2 showing a section through one of the longitudinal spaces between each set of interlocking ribs on each side wall of the bait box.
Figure 5:
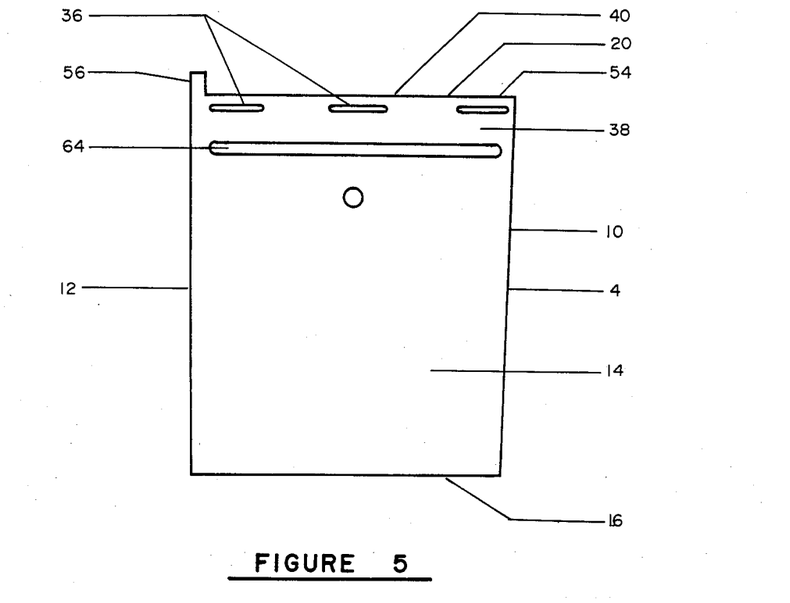
FIG. 5 is a side elevation view of a bait box in accordance with this invention without its lid.
Figure 12:
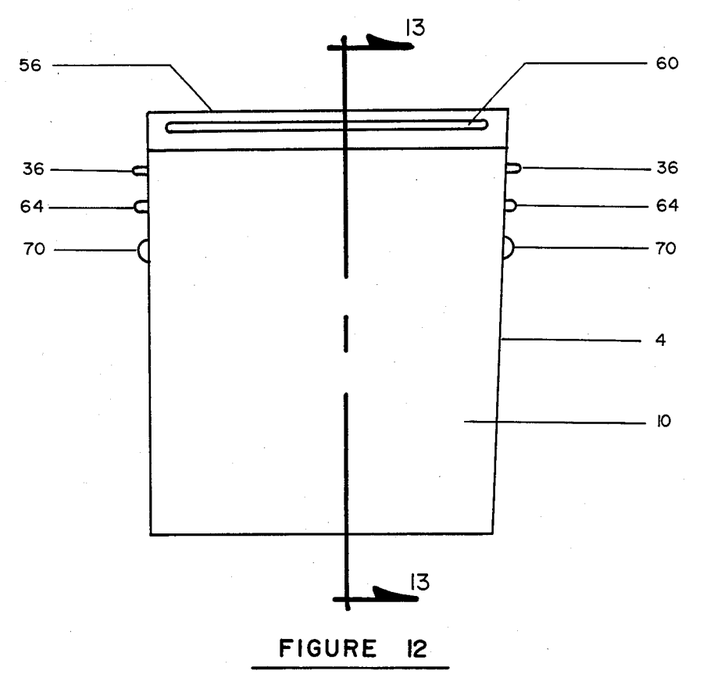
FIG. 12 is a front elevation view of a bait box in accordance with this invention with its lid removed.

Each of the bait boxes 4 described herein are the same so only one will be described in detail. It includes peripheral side walls 8 which as shown herein are substantially square in cross-sectional configuration including a front wall 10, a rear wall 12, and two opposite side walls 14 of substantially equal dimension. The box 4 also includes a bottom wall 16. The peripheral walls 10, 12 and 14, and the bottom wall 16 are solid and imperforate and define a cavity or chamber 18 therebetween. The top wall 20 is open, but it is provided with a lid 22 which can be manipulated to open and close the box 4, and when closed the lid 22 provides an air tight and water tight seal for the cavity or chamber 18.

Figure 6:
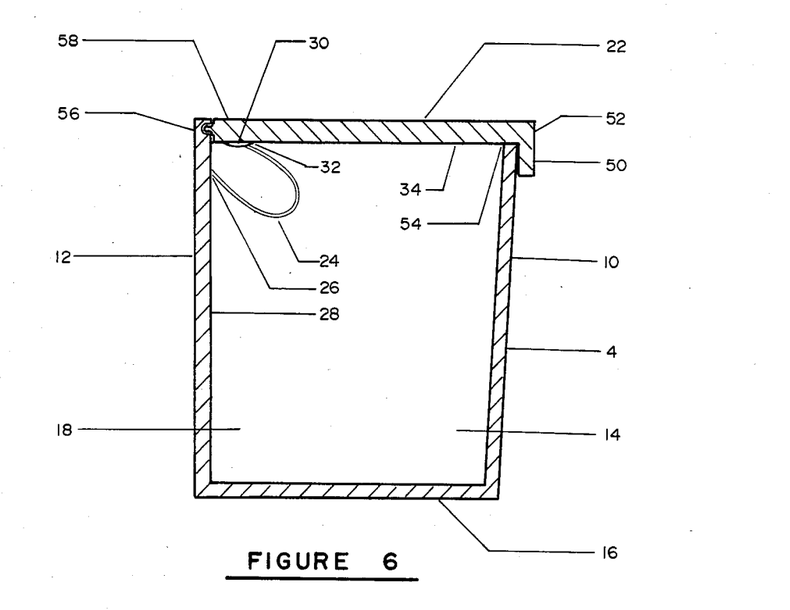
FIG. 6 is a section view taken on line 6—6 of FIG. 4.
Figure 13:
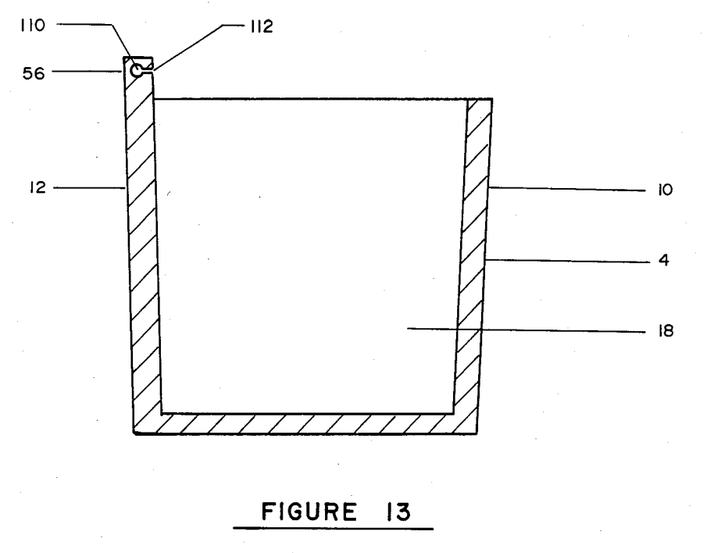
FIG. 13 is a section view taken on line 13—13 of FIG. 12.

The lid 22 is connected to the box 4 by a flexible loop hinge 24 of flexible sheet material such as plastic affixed at one end 26 to an upper portion of the inner surface 28 of rear wall 12 of the box 4 and at the other end 30 to the rear edge 32 of the inner facing surface 34 of the lid 22. The flexible loop hinge 24 may also be connected to box 4 and lid 22 outside of the box.

The lid 22 and box 4 are provided with releasable interlocking means comprising longitudinally spaced apart rib members 36 projecting outwardly from the outer surfaces 38 of the upper edge 40 of the opposite side walls 14 of the box 4, and corresponding longitudinally spaced apart groove members 42 having grooves 44, the groove members 42 being integrally formed with and extending downwardly from the inner facing surface 34 of the lid 22 along the opposite side edges 46 of lid 22. The spaces 48 between said spaced apart groove members 42 correspond in longitudinal dimension to that of said rib members 36 of the box 4. Thus, the lid 22 is placed in position for closing the box 4 by laying over the open top wall 20 at a forward position in which the outwardly projecting rib members 36 of the box 4 are received in corresponding spaces 48 for positioning in registration with the grooves 44 of the lid's groove members 42. The lid 22 is then pushed rearwardly to completely cover the top wall 20 at which time the rib members 36 of the box 4 slide into the grooves 44 of groove members 42 of the lid 22, to hold the lid securely locked in place thereby providing a water tight and air tight closure for the cavity or chamber 18.

Figure 7:
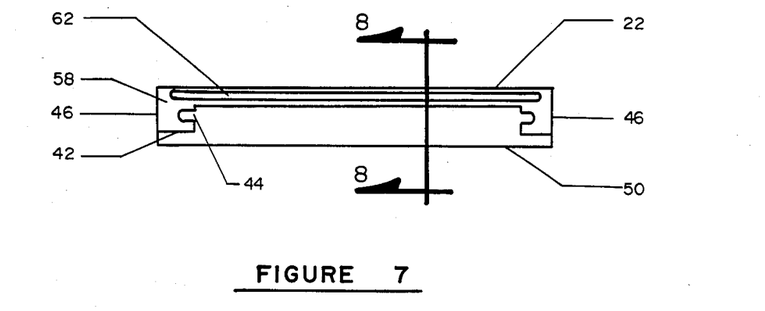
FIG. 7 is an elevation view from the rear of a lid for use with a bait box in accordance with this invention.

To open the box 4, the lid 22 is pulled forwardly until the spaced apart rib members 36 of box 4 slide completely out of the corresponding groove members 42 of the lid 22 at which time the lid 22 can be lifted up to open the box 4. The flexible loop hinge 24 which permanently connects the lid 22 to the box 4 has a longitudinal dimension at least as great as the longitudinal dimension of the rib members 36 and corresponding groove members 42 to permit the lid 22 to slide forward enough for its groove members 42 to completely release from the rib members 36 of the box 4.

The longitudinal dimensions of the rib members 36, groove members 42 and spaces 48 are preferably substantially equal.

Figure 8:
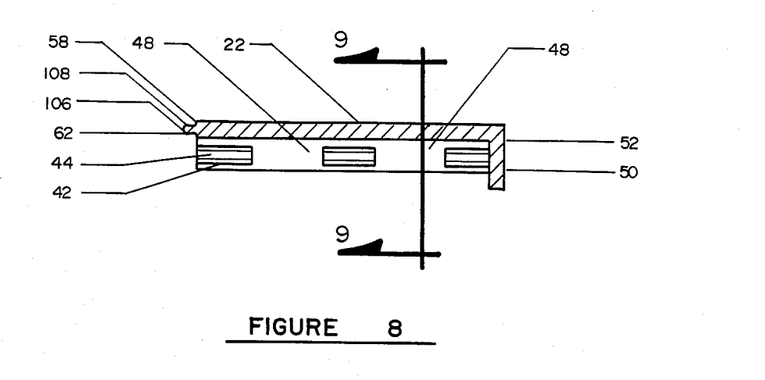
FIG. 8 is a section view taken on line 8—8 of FIG. 7.
Figure 9:
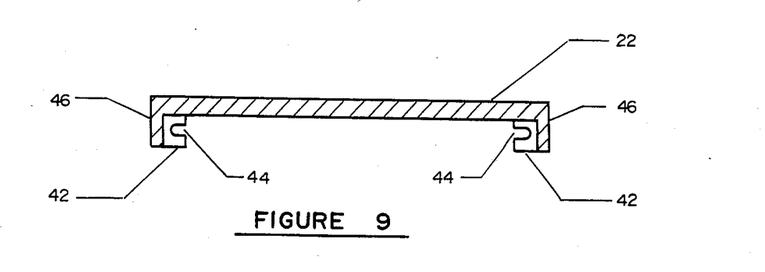
FIG. 9 is a section view taken on line 9—9 of FIG. 8.

A depending flange 50 extends downwardly from the front edge 52 of the lid 22 to bear against the upper portion 54 of the front wall 10 of the box 4 when lid 22 is completely closed.

An upstanding abutment wall 56 extends upwardly from the rear wall 12 of the box 4 against which the rear edge 58 of the lid 22 abuts when it is completely closed. A laterally extending groove 60 is provided across at least a substantial portion of the abutment wall 56 to receive a corresponding laterally extending rib 62 projecting outwardly from and across a corresponding portion of the rear edge 58 of the lid 22, to hold the lid 22 even more securely in airtight and water tight relationship to the box 4 when in the completely closed position.

Figure 11:
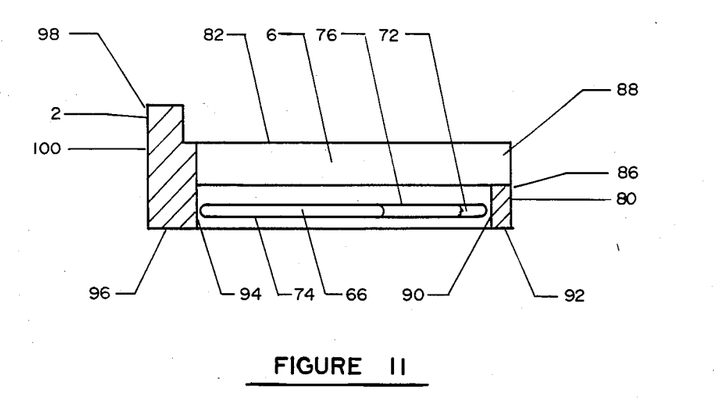
FIG. 11 is a section view taken on line 11—11 of FIG. 10.

The side walls 14 of box 4 are provided with outwardly projecting support ribs 64 which extend longitudinally from the front wall 10 to the rear wall 12 substantially parallel to the upper edge 40 of the box 4. The support ribs 64 rest on corresponding ledges 66 projecting inwardly of the apertures 6 of the rack assembly 2 and along the opposite side edges 68 of the apertures 6.

The ledges 66 project inwardly of the apertures 6 a sufficient distance to bear firmly against the facing portions of side walls 14 of boxes 4 when seated in corresponding aperatures 6 of the rack assembly 2. A rounded detent member 7 is provided to project outwardly from each side wall 14 of box 4 spaced apart downwardly from the corresponding support ribs 64 a distance substantially equal to the thickness dimension 72 of the corresponding ledge 66 so the detent member 70 bears against the bottom wall 74 of ledge 66 when support rib 64 is seated on the top wall 76 of the ledge 66. Such construction prevents the boxes 4 from being jostled or bounced out of the rack assembly 2 when the boat is underway at high speed in rough water. However, the boxes 4 may be readily inserted in the rack 2 and removed therefrom by exerting firm pressure downwardly to seat in place and upwardly when desiring to remove. The detent members 70 are located inwardly from the top, bottom, front and rear edges of the side walls 14 a sufficient distance to bow the side walls in far enough for the rounded detent members 70 to be forced past the ledges 66 after which the side walls 14 flex back again to their original position.

The boxes 4 in accordance with this invention are preferably made of a material such as polypropylene whereby the walls and lid are relatively rigid but which have some ability to flex. A synthetic material such as polypropylene also does not rust and is not otherwise as adversely affected as materials such as metal or wood. However, those materials may also be used in which case they should be coated with appropriate paint or other protective coatings. The lids 22 do not have to be of the same material as the boxes 4. The lids 22 have a window 78 covered by a transparent material such as plexiglass or they may be made entirely of such transparent material to enable the fisherman to see into the chamber 18 when the lid is closed.

The rack assembly 2 includes an elongated frame member 80 having spaced apart apertures 6 in side-by-side relationship to receive corresponding ones of the bait boxes 4. The apertures 6 have a cross-sectional configuration and dimension corresponding to that of the boxes with lids to be received therein. In the embodiment described, the cross-sectional configuration is substantially square, but it may be of other desired shapes.

The top wall 82 of the frame member 80 is preferably planar, and the ledges 66 of frame member 80 which project inwardly of the apertures 6 are spaced apart downwardly from the top wall 82 a sufficient distance to enable the outer facing surface 84 of the lids 22 of the boxes 4 to be substantially coplanar with the surface of top wall 82 when seated in the apertures 6 with their support ribs 64 resting on the ledges 66.

The front wall 86 of the frame member 80 extends downwardly from the top wall 82 and includes cut-away portions 88 in registration with the front edges 52 of lids 22 when boxes 4 are seated in the rack assembly 2. The cut-away portions 88 have a width dimension and height dimension great enough to permit the lids 22, including their depending flanges 50 across the front edges 52, to clear when the lids 22 are slid forwardly enough for the corresponding rib members 36 and groove members 42 to disengage so the lids can be lifted to open the boxes 4. Such structure enables each box to be opened and closed while firmly seated in the rack assembly. It is not necessary to remove a box from the rack assembly for it to be opened and closed.

When box 4 is received in aperture 6 of rack assembly 2, the front wall 10 of box 4 bears firmly against the inner surface 90 of the front wall 92 of aperture 6 and the rear wall 12 of box 4 bears firmly against the inner surface 94 of the rear wall 96 of aperture 6.

A mounting ledge 98 extends upwardly from the rear wall 100 of the frame member 80, for mounting the rack assembly 2 to the side of a boat 102. As illustrated, mounting bolts 104 are used to secure the rack assembly to the side of the boat. Other mounting members can be provided to mount the rack assembly 2 to a boat in different ways and to differt parts of the boat such as to the bottom or floor of the boat.

The rack assembly 2 in accordance with this invention has been designed and constructed to be permanently mounted in the boat and left in the boat when the fisherman has finished fishing for the day. The bait boxes 4 in accordance with this invention have been designed and constructed in such a way that they can be readily removed from the rack assembly 2 when fishing is done and taken home. They are preferably of a small enough size and shape to fit in the fisherman's tackle box in a convenient and orderly way, not only for carrying and storage but that also enables the fisherman to use the bait boxes when fishing from a pier or from land without using the boat and rack assembly. The bait boxes can in such case be used from their position in the tackle box, or if desired by removing from the tackle box and placing on the ground.

The rack assembly 2 as shown and described herein has four apertures 6 to receive four bait boxes. However this invention can include more apertures in the rack and bait boxes or fewer.

The laterally extending rib 62 which projects rearwardly from the rear edge 58 of the lid 22 is preferably formed with an enlarged free end 106 extending from a narrower neck 108. The laterally extending groove 60 which is formed in the upstanding abutment wall 56 which projects upwardly from the rear wall 12 of the box 4 is correspondingly preferably formed with an enlarged undercut portion 110 corresponding in shape and dimension to the enlarged free end 106 of the laterally extending rib 62 which seats therein. The material from which the box 4 and its abutment wall 56 is made has a resilient flexing characteristic sufficient to allow the narrow entrance 112 of the groove 60 to expand enough to receive the enlarged free end 106 of the rib 62 and allow it to pass through to seat in the enlarged undercut portion 110. The rib 62 extending from the rear edge 58 of lid 22 may also be made of material which has some resilience to allow some compression of the enlarged free end 106 of rib 62 as it passes through the narrow entrance 112 of the groove 60, after which it re-expands to its original size when it seats in the enlarged undercut portion 110 of the groove 60. This construction securely holds the lid 22 in closed position when the laterally extending rib 62 is fully received in the laterally extending groove 60 of the abutment wall 56 of box 4 and prevents the lid 22 from accidentally and unintentionally sliding forward and disengaging the interlocking rib members 36 along the side walls of box 4 from the groove members 42 along the side walls of the lid 22. Yet the rib 62 can be readily pulled out of the groove 60 when it is desired and intended to open the bait box 4 by applying sufficient manual force in a forward sliding direction.

I claim:

1. A bait box and rack assembly comprising a container having a chamber to receive bait, openable closure means movable between an open position and a closed position to close said chamber against entrance and escape of water and air when in said closed position, releasable locking means to releasably lock said closure means in said closed position until intended force is applied to intentionally move to said open position, a rack frame member receivable in a boat and removable from a boat, aperture means in said rack frame member to receive and hold said container, said aperture means having a peripheral configuration and dimension corresponding to that of said container, releasable securing means to secure said container in said aperture means to releasably secure said container therein until intended force is applied to intentionally move said container out of said aperture means.

2. A bait box and rack assembly as set forth in claim 1, wherein said aperture means of said rack frame member includes a plurality of apertures to receive a plurality of said containers.

3. A bait box and rack assembly as set forth in claim 1, wherein said rack frame member includes rack stop means positioned relative to said aperture means to permit said container to be received in said aperture means to a predetermined distance, and said container includes a side wall, corresponding container stop means integrally formed on said side wall projecting outwardly therefrom to engage said rack stop means when said predetermined distance has been reached.

4. A bait box and rack assembly as set forth in claim 3, wherein said rack frame member includes an upwardly facing planar surface, said container with said closure means in said closed position includes an upwardly facing planar surface when received and held in said rack frame member, said predetermined distance at which said container is received in said aperture means of said rack frame member is that at which said upwardly facing planar surfaces of said rack frame member and said container are coplanar, said upwardly facing surfaces of said rack frame member and said container received therein comprising a smooth planar upwardly facing surface of said bait box and rack assembly.

5. A bait box and rack assembly as set forth in claim 1, wherein said container and said openable closure means include respective overlapping side walls, said releasable locking means includes first groove means on said overlapping side wall of one of said elements comprising said container and said openable closure means and first rib means on said overlapping side wall of the other to be received in said first groove means when said closure means is moved to said closed position and to be removed therefrom when said closure means is moved to said open position.

6. A bait box and rack assembly as set forth in claim 5, wherein said container and said openable closure means include respective facing end walls, said releasable locking means includes second groove means on said facing end wall of one of said elements comprising said container and said openable closure means and projecting means on said facing end wall of the other to be received in said second groove means when said closure means is moved to said closed position and to be removed therefrom when said closure means is moved to said open position.

7. A bait box and rack assembly as set forth in claim 6, wherein said second groove means includes an undercut groove having a relatively narrower entrance and a relatively larger undercut portion comprising a continuous inwardly facing peripheral wall extending from said entrance in both directions to define an enlarged cavity bounded by said peripheral wall and to which said relatively narrower entrance opens, said projecting means includes a rib having an enlarged free end corresponding in size and shape to said relatively larger undercut portion of said groove and a relatively narrower neck corresponding in size and shape to said relatively narrower entrance of said groove, one of said elements comprising said groove of said second groove means and said rib of said projecting means being sufficiently resilient to enable said enlarged free end of said rib to pass through said relatively narrower entrance of said groove when intended non-accidental force is applied to force said enlarged free end of said rib into and out of said undercut groove.

8. A bait box and rack assembly as set forth in claim 3, wherein said releasable securing means includes said rack stop means and said corresponding container stop means, said container stop means being above said rack stop means when said predetermined distance has been reached, one of said elements comprising said container and said rack frame member including a releasable securing member below said rack stop means when said predetermined distance has been reached to prevent removal of said container by restraining movement thereof upwardly from said rack frame member until an intended non-accidental upwardly directed force is applied to said container to force said container out of said rack frame member, said releasable securing means releasing said container for removal from said rack frame member when said upwardly directed force is applied to said container.

9. A bait box and rack assembly as set forth in claim 1, wherein said rack frame member includes a planar upwardly facing surface, a cut-away portion extending downwardly therefrom and positioned relative to said aperture means to permit sliding said openable closure means of said container through said cut-away portion between said open and closed positions while said container is received in said aperture means of said rack frame member.

10. A bait box and rack assembly as set forth in claim 4, wherein said container is a rectangular box having a rear wall, a front wall, two opposite side walls, a bottom wall, said rear, front, side and bottom walls being imperforate, an open top wall, said openable closure means comprises a lid having parallel spaced apart outwardly facing planar surfaces to cover said open top wall when in said closed position, at least a portion of said lid being transparent to view the interior of said chamber when said lid is in said closed position.

11. A bait box and rack assembly as set forth in claim 1, wherein said openable closure means is permanently connected to said container, including permanent connection means to permanently connect said openable closure means to said container.

12. A bait box and rack assembly as set forth in claim 11, wherein said container includes an open wall, said openable closure means includes a closure member to close said open wall, said permanent connection mean includes a longitudinally elongated flexible hinge member having two opposite ends permanently connected at one end to said container and permanently connected at its other end to said closure member, said flexible hinge member having a longitudinal dimension greater than its lateral dimension and sufficient to enable said closure member to move between said open position and said closed position, said closure member being completely removed and spaced apart from said container a distance greater than the lateral dimension of said hinge when in said open position, at such time said closure member being connected to said container by said longitudinally elongated flexible hinge member.

13. A bait box and rack assembly comprising a container having a chamber to receive bait, openable closure means movable between an open position and a closed position to close said chamber against entrance and escape of water and air when in said closed position, releasable locking means to releasably lock said closure means in said closed position until intended force is applied to intentionally move to said open position, a rack frame member, aperture means in said rack frame member to receive and hold said container, releasable securing means to secure said container in said aperture means to releasably secure said container therein until intended force is applied to intentionally move said container out of said aperture means wherein said rack frame member includes rack stop means positioned relative to said aperture means to permit said container to be received in said aperture means to a predetermined distance, and said container includes corresponding container stop means to engage said rack stop means when said predetermined distance has been reached, wherein said releasable securing means includes said rack stop means and said corresponding container stop means, said container stop means being above said rack stop means when said predetermined distance has been reached, one of said elements comprising said container and said rack frame member including a releasable securing member below said rack stop means when said predetermined distance has been reached to prevent removal of said container from said rack frame member until an intended non-accidental force is applied to force said container out of said rack frame member, wherein said releasable securing member below said rack stop means comprises flexible detent means movable between a flexed and non-flexed position projecting outwardly from said container to engage an under portion of said rack stop means when said container is fully received in said rack frame member and when said flexible detent means is in its non-flexed position, said flexible detent means being movable a sufficient distance when flexed to move out of restraining engagement with said rack stop means to permit insertion of said container in said rack frame member and withdrawal therefrom when said intended non-accidental force is applied in the direction of insertion to insert and in the direction of withdrawal to withdraw.

* * * * *